United States Patent Office 3,464,952
Patented Sept. 2, 1969

3,464,952
POLYETHYLENE STABILIZED BY TREATMENT WITH SULFUR DIOXIDE IN THE PRESENCE OF FREE RADICALS
Donald W. Larsen, Ashton, Md., assignor to W. R. Grace & Co., New York, N.Y., a corporation of Connecticut
No Drawing. Filed Jan. 23, 1967, Ser. No. 610,807
Int. Cl. C08f 27/06, 45/56
U.S. Cl. 260—45.7          8 Claims

ABSTRACT OF THE DISCLOSURE

Polyethylene in solid particulate form is reacted with sulfur dioxide in the presence of a free radical generator to produce a stabilized polymer.

---

Stabilization of polyethylene by the method of this invention gives a product which is useful at higher temperatures than polyethylene stabilized with conventional stabilizers because some degree of crosslinking of the polymer takes place. In addition, the instant method is an especially low cost way of stabilizing very high molecular weight polyethylenes as well as the conventional commercial polyethylenes.

Briefly stated, the process of the present invention comprises reacting polyethylene in solid particulate form with sulfur dioxide gas in the presence of a free radical generator to produce a stabilized thermoplastic polymer.

The type of solid polyethylene used in the present invention is not critical and depends largely on the use made of the stabilized polymer. The particulate form of the polyethylene provides a high surface area for contact with the sulfur dioxide gas and may be any form such as pellets, chips, or a free flowing powder.

The reaction of the polyethylene with the sulfur dioxide gas is preferably carried out in the substantial absence of air. The reaction is initiated by a free radical generator such as radiation or a chemical such as benzoyl peroxide.

Irradiation can be accomplished by any conventional method. Thus, there can be used electrons; X-rays; gammarays by employing iron 59 or cobalt 60; β-rays, for example, by employing cobalt 60, carbon 14, phosphorus 32 or strontium 90; or ultraviolet light. The irradiation source can also be an electrical machine such as a Van de Graaff type electron accelerator.

Irradiation can be carried out at room temperature or any higher temperature at which the polyethylene retains its solid particulate state. Satisfactory results are attained at room temperatures.

The radiation dose may vary and generally ranges from a dose of about 0.1 to about 50 megarads. The degree of stabilization of polyethylene irradiated in the presence of sulfur dioxide is proportional to the dose. In addition, in carrying out the instant process of irradiating polyethylene particles in the presence of sulfur dioxide gas, the polyethylene is crosslinked. The degree of crosslinking depends on the original molecular weight of the polymer and is proportional to the radiation dose. Low molecular weight polyethylene can be treated with larger radiation doses than a high molecular weight polyethylene and still remain processable.

Representative of the chemical free radical generators useful in the process of the present invention is benzoyl peroxide, di(tert-butyl) peroxide, dichlorobenzoyl peroxide, tert-butyl peracetate and dicumyl peroxide. The amount of chemical free radical generator may range from about 0.1 to about 2 percent by weight of the polyethylene. The degree of stabilization of polyethylene is proportional to the amount of free radical generator used.

The chemical free radical generator is admixed with the polyethylene particles by any conventional method wherein the polymer particles retain their form and which provides a good mixture. Preferably, the chemical free radical generator is dissolved in an easily vaporizable solvent. The solution is then sprayed or admixed with the polyethylene particles by any conventional method and the solvent allowed to evaporate.

To carry out this embodiment of the process of the present invention, the chemical free radical generator containing polyethylene particles are contacted with sulfur dioxide, preferably in the absence of air, and heated to the temperature at which the chemical free radical generator decomposes and generates free radicals. The polyethylene retains its solid particulate form throughout the process. Although, in some instances, the decomposition temperature of the free radical generator may be higher than the melting point of the polyethylene, the polyethylene retains its solid particulate form since such temperature is applied for a very short time as illustrated by the half life, i.e. the time required for the decomposition of half the sample of the following typical free radical generators.

| Free radical generator: | Half-life |
|---|---|
| Benzoyl peroxide | 1 minute at 133° C. |
| Di(tert-butyl) peroxide | 1 minute at 190° C. |
| Dichlorobenzoyl peroxide | 1 minute at 112° C. |
| Tert-butyl peracetate | 1 minute at 160° C. |
| Dicumyl peroxide | 1 minute at 171° C. |

Since the present stabilized particulate form polyethylene has a melting point higher than that of the untreated polymer, it is useful at temperatures higher than normally can be used for the untreated polymer. The stabilized polyethylene also undergoes normal processing conditions without degrading to any significant extent.

All parts and percentages used herein are by weight unless otherwise indicated.

The invention is further illustrated by the following examples.

Unless otherwise stated, tests in the following examples were made as follows:

Test for Embrittlement by Hand Flexing: The sample films are considered to be in good shape if they can be hand flexed 10 times without cracking. Sample films are judged to be failing if they start to crack in 5 to 10 bends. The sample films are considered to have failed completely if they crack on bending 1 or 2 times.

Reduced Specific Viscosity (RSV): Measured according to ASTM D 1601-61 with a solution of 0.1 g. of the polymer in 100 cc. Decalin at 135° C.

Density: Measured according to ASTM D 1505-57T.

Example 1

In this example, solid particle form polyethylene having an RSV of 1.5 and a density of 0.96 was used.

A portion of the polyethylene, Sample A, was irradiated in sulfur dioxide by a Van de Graaff electron accelerator. Specifically, 100 grams of the polyethylene were placed in a variable T and A irradiation cell with a copper window. The container was flushed with sulfur dioxide gas to displace most of the air, but not effort was made to remove the last bit of air. The sulfur dioxide filled container was passed under the electron beam of the accelerator until a dose of 1 megarad was obtained.

Another portion of the polyethylene, Sample B, was treated with benzoyl peroxide in the presence of sulfur dioxide. Specifically, 1,000 grams of the polyethylene particles were tumbled in a 5 weight percent solution of benzoyl peroxide in benzene until the particles were thoroughly coated. The particles were dried by allowing the solvent to evaporate in air. The dried coated polyethylene particles were placed in a rotating 12 liter creased flask and heated to 120° C. for 60 minutes while sulfur dioxide was passed through.

Films having a thickness of about 20 mils were heat compression molded from each of Samples A and B and also from the untreated polyethylene which was used as a control.

All of the films were placed in a circulating air oven maintained at a temperature of 100° C. to determine their aging properties.

The embrittlement of the films, i.e., loss of flexibility was determined by hand flexing. The results are shown in Table I.

TABLE I.—AGING IN AIR AT 100° C.

| Film | Initial failure days (5 to 10 flexes) | Complete failure days (1 to 2 flexes) |
|---|---|---|
| Sample A (1 megarad in $SO_2$) | 140 | 167 |
| Sample B (benzoyl peroxide + $SO_2$) | 140-167 | 1 230 |
| Control | | 2 |

[1] Test ended before complete failure.

Table I illustrates the long useful life of films formed from polyethylene stabilized according to the present invention.

Example 2

In this example, solid particle form polyethylene having an RSV of 4.5 was used.

A portion of the polyethylene was irradiated in the presence of sulfur dioxide gas with a dose of 1 megarad as set forth in Example 1.

A portion of the thus irradiated polyethylene was milled at 180° C. in a Brabender Plastograph in oxygen for 10 minutes.

Films having a thickness of about 20 mils were compression molded from the untreated polyethylene, the irradiated polyethylene and from the milled irradiated polyethylene.

All of the films were placed in a circulating air oven maintained at a temperature of 100° C. to determine their aging properties. The embrittlement of these films was determined by hand flexing. The results are shown in Table II.

TABLE II.—AGING IN AIR AT 100° C.

| Polyethylene film | Initial failure days (5 to 10 flexes) | Complete failure days (1 to 2 flexes) |
|---|---|---|
| Control | | 5 |
| 1 megarad in $SO_2$ | OK after 230 days [1] | |
| 1 megarad in $SO_2$ and then milled in $O_2$. | 140-167 | 230 |

[1] Test stopped.

As illustrated in Table II, films formed from the polyethylene irradiated in sulfur dioxide showed no initial failure after 230 days in the oven. Moreover, films formed from the milled irradiated polyethylene showed only initial failure after being in the oven from 140-167 days. This illustrates the relatively small effect normal processing conditions have on the stabilized polyethylene of the present invention.

Example 3

In this example, two types of solid particle form polyethylene were stabilized according to the present invention. Films having a thickness of about 20 mils were heat compression molded from each of the untreated polyethylenes and from each of the stabilized polyethylenes. All of the films were placed in a circulating air oven maintained at 150° C. to determine their aging properties. The results are shown in Table III.

In Table III, Film A was control film formed from particle form polyethylene having an RSV of 4.5. Films B–E were formed from the particle form polyethylene of RSV=4.5 which was irradiated with a specific radiation dose in sulfur dioxide gas as set forth in Example 1.

Film F was a control film formed from particle form polyethylene having an RSV of 1.5 and a density of 0.96. Films G–J were formed from this polyethylene which was irradiated with a specific radiation dose in sulfur dioxide as set forth in Example 1.

TABLE III.—AGING IN AIR AT 150° C.

| Films | Particle form polyethylene | Treatment | Initial failure hours (5 to 10 flexes) | Complete failure hours (1 to 2 flexes) |
|---|---|---|---|---|
| A | Polyethylene RSV=4.5 | Control | | 4 |
| B | do | 0.125 meg. in $SO_2$ | 24 | 146 |
| C | do | 0.25 meg. in $SO_2$ | 24 | 146 |
| D | do | 0.5 meg. in $SO_2$ | 334 | 574 |
| E | do | 1 meg. in $SO_2$ | 430-1174 | |
| F | Polyethylene, 0.96 density, RSV=1.5. | Control | | 2 |
| G | do | 1 meg. in $SO_2$ | 89 | 183-30 |
| H | do | 2 meg. in $SO_2$ | 183 | 375-519 |
| I | do | 4 meg. in $SO_2$ | 283-879 | 1300 |
| J | do | 8 meg. in $SO_2$ | 1300 | |

As illustrated in Table III, the stability of the polyethylene improves with higher radiation doses in the sulfur dioxide Example 4

In this example, solid particle form polyethylene having a reduced specific viscosity of 4.5 was used.

A portion of this polyethylene was irradiated with 1 megarad in the presence of sulfur dioxide gas as set forth in Example 1.

For comparison, a second portion of the polyethylene was irradiated with 1 megarad as set forth in Example 1 except that the irradiation was carried out in the presence of air instead of sulfur dioxide gas.

In addition, a third portion of the polyethylene was irradiated with 1 megarad as set forth in Example 1 except that the irradiation was carried out in the presence of nitrogen instead of sulfur dioxide gas.

Samples of the untreated polyethylene and each of the treated polyethylenes were placed in a circulating air oven maintained at 120° C. to determine their aging characteristics. At the end of 48 hours, the samples were removed from the oven and the extent to which they were oxidized was measured by determining their carboxyl content.

The carboxyl content was determined by accurately weighing about 1 g. of the polymer and dissolving it in 100 ml. of xylene by heating to 120–130° C. with stirring in a 500 ml. Erlenmeyer flask on a magnetic stirrer-hot plate. About 10–20 drops of 0.1% thymol blue in absolute ethanol was added to the solution. While continuing stirring and maintaining the temperature at 120–130° C., the solution was titrated to a blue end point with standard 0.1 N potassium hydroxide in absolute ethanol.

Calculation:

Milliequivs. COOH per gram $$= \frac{(\text{ml. of KOH})(N \text{ of KOH})}{(\text{g. of polymer})}$$

The results are shown in Table IV.

Table IV.—Aged in air at 120° C. for 48 hours

| Polyethylene: | Milliequivs. COOH per gram of polymer |
|---|---|
| Control | .25 |
| 1 megarad in $N_2$ | .27 |
| 1 megarad in air | .67 |
| 1 megarad in $SO_2$ | .003 |

Table IV illustrates the degree to which sulfur dioxide contributes to the stabilization of the polyethylene of the present invention.

What is claimed is:

1. A process for stabilizing solid particulate form polyethylene which comprises contacting said polyethylene with an atmosphere consisting essentially of substantially sulfur dioxide gas in the presence of free radicals for a time sufficient to stabilize the polymer.

2. A process according to claim 1 wherein the free radicals are provided by irradiation to a dosage in the range 0.1 to 50 megarads.

3. A process according to claim 1 wherein the free radicals are provided by a chemical free radical generator, the amount of chemical free radical generator being in the range from about 0.1 to about 2% by weight of the polyethylene.

4. A process according to claim 3 wherein the chemical free radical generator is selected from the group consisting of benzoyl peroxide, di(tert-butyl) peroxide, dichlorobenzoyl peroxide, tert-butyl peracetate and dicumyl peroxide.

5. A stabilized polyethylene produced by the process of claim 1.

6. A stabilized polyethylene produced by the process of claim 2.

7. A stabilized polyethylene produced by the process of claim 3.

8. A stabilized polyethylene produced by the process of claim 4.

References Cited

UNITED STATES PATENTS

| 3,200,056 | 8/1965 | Bond et al. | 204—154 |
| 3,231,481 | 1/1966 | Amemiya et al. | 204—154 |
| 3,361,713 | 1/1968 | Meyer et al. | 260—45.85 |

DONALD E. CZAJA, Primary Examiner

R. A. WHITE, Assistant Examiner

U.S. Cl. X.R.

204—159.18; 260—94.9